Patented Sept. 27, 1938

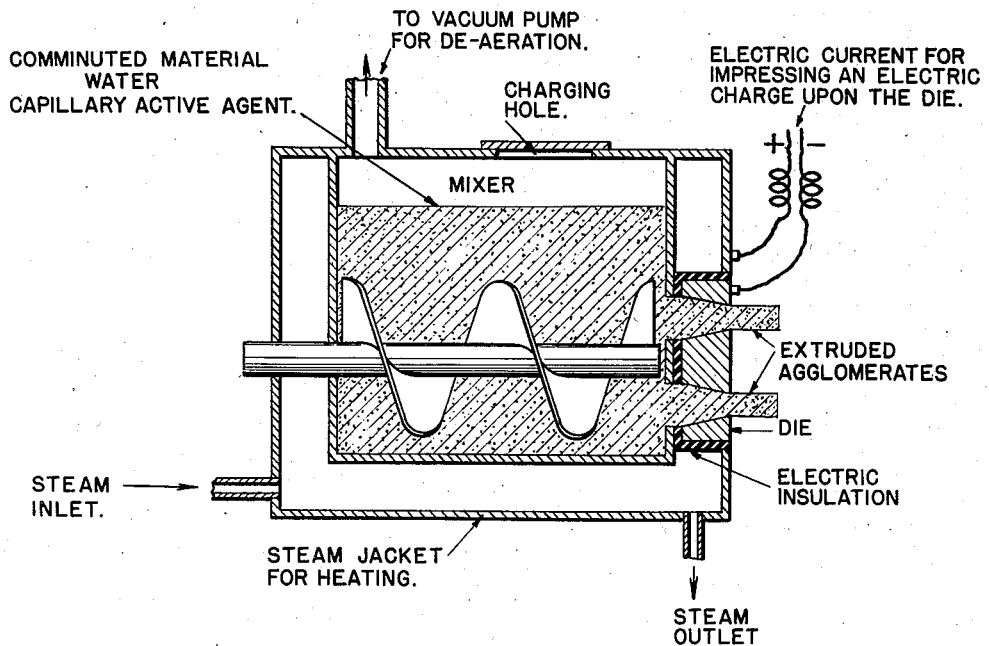

2,131,074

UNITED STATES PATENT OFFICE 2,131,074

AGGLOMERATING COMMINUTED ZINCIFEROUS MATERIALS

John F. W. Schulze, Shaker Heights, Ohio, assignor, by mesne assignments, to E. I. du Pont de Nemours & Company, Wilmington, Del., a corporation of Delaware Application May 20, 1935, Serial No. 22,492

14 Claims. (Cl. 75—3)

This invention relates to agglomerates of zinciferous materials and to the novel processes of producing such agglomerates.

The invention is particularly applicable to the agglomeration of zinciferous materials such as zinc ores and more particularly to oxidic zinc materials such as natural zinc oxide, carbonate or silicate ores, also transformation products of zinc ores, such as roasted zinc sulfid ores which contain zinc oxide and may contain other heavy metal compounds, or by-products or intermediate products of metallurgical operations such as zinciferous flue dust, refuse zinc oxide, crude zinc oxide such as for instance produced in the so-called Waelz process, etc.

The invention is also particularly applicable to the production of agglomerates of such zinciferous ores with carbonaceous fuels and the agglomerates produced according to my invention are, for instance, intended to be used in thermic operations where it is desired to reduce the ore to recover metallic zinc or zinc oxide therefrom.

In producing agglomerates for such uses it has been customary heretofore to rely upon forces of adhesion to obtain physical strength in the agglomerates and it has been the practice to incorporate with the material a substantial amount of a binder which, irrespective of the surface characteristics of the comminuted materials to be agglomerated, glues or cements the particles of material together. Binders commonly used in forming agglomerates of this kind are pasty, viscous, adherent, more or less colloidal substances such as glues, molasses, concentrated sulfite cellulose waste liquor, tar or pitch; or substances setting to a solid mass, such as colloidal clays, cements, etc., which solidify in the agglomerates.

My invention is based upon an entirely different concept. I rely upon forces of capillarity or capillary coherence for maintaining the physical strength of the agglomerates and to effect this I provide for means whereby all the individual particles in the shaped agglomerates come in direct contact with thin films of liquid which bond the individual particles together by capillary attraction and at the same time render the mass of particles plastic by their lubricating effect.

I obtain this object by moistening the material to be agglomerated with a solution of a capillary active agent, that is an agent which so modifies the interfacial energy between the particles to be agglomerated and the solution that substantially the entire surface of the individual particles becomes coated with thin films of said solution so that the particles can slide against each other; the material becomes plastic, while at the same time the particles are held together by the capillary attraction between the solid particles and the solution.

The attached figure shows in a schematic manner the working of my novel process of agglomerating comminuted zinciferous material.

The drawing shows a vessel called mixer in which the comminuted zinciferous material, the necessary water and capillary agent are mixed; when the required plasticity is obtained the mixture is extruded through a die.

As is explained further on, it is sometimes advisable to heat the mixture which can, for instance, be done by passing a heating fluid, such as steam, through the jacket surrounding said mixer, and to deaerate the mixture which is being worked, which is conveniently done in this type of apparatus by connecting said vessel with an operating vacuum pump.

It is also sometimes recommended to impress an electric potential upon the mass as it is being extruded and to this effect I have shown in this drawing the electric connections through which this is effected.

It will be understood that my invention is not limited by this type of apparatus as illustrated, but that my process can be carried out in various types of equipment which permit the plasticizing or kneading of moistened comminuted materials and the shaping or agglomerating of such plastic masses.

The capillary active agent is incorporated in, and uniformly distributed throughout the moistened mass by mechanical working or kneading and the mass is then ready for forming or molding into any desired predetermined shape.

In order to secure thorough distribution of the liquid films between all the particles of the mass to be agglomerated, it is advantageous to displace the air, or other gas, that adheres to the surface of these particles, or may be occluded therein. The displacement of such air or gas, and the substitution of liquid films therefor, may be facilitated by the application of a vacuum during the operation of mechanical working or kneading, or during part of such operation. Heat may also be applied for the same purpose.

Binders of the type previously used may be incorporated in agglomerates prepared in accordance with my invention; such binders may be desirable in case it is advantageous for the agglomerates to retain substantial strength after elimination of moisture therefrom by drying.

In cases where it is desired to add a binder to a mass agglomerated with the agents of my invention, less binder than customary need be used; moreover, less mechanical work is needed to incorporate the binder with the material to be agglomerated, and in addition a type of apparatus for plasticizing the mass becomes available which cannot be used in the absence of the agents of my invention.

When agglomerates prepared according to the invention are dried, the capillary-active agent remains present within the interstices between the particles of the agglomerate.

Substances which I found to be able, when in contact with particles of zinciferous materials to be agglomerated, to produce valuable aggregates in which forces of capillarity are relied upon for the physical strength of the aggregates are characterized by being capillary-active and able to create or increase plasticity in comminuted zinc materials, which per se are not plastic. It will also be understood that in the case of, particularly, basic zinc materials the agent should not react with the zinc oxide or other basic material possibly present in the mixture, whereby insoluble reaction products with the agent would be formed which would not have the beneficial action.

Among agents of this type I found certain groups of organic materials particularly useful in my invention, namely the so-called textile wetting agents, the aqueous solutions of which greatly increase the wettability and penetrability of textile fibres.

Many of these textile wetting agents contain a large carbon-hydrogen radical to which one or more $SO_3$—X groups are attached (in which X is hydrogen or a salt forming group) and it is among such textile wetting agents that I found some of the most available agents useful in my invention, though other capillary-active compounds not necessarily used as textile wetting agents are appropriate for use in my invention.

The following are examples of agents useful in the practice of my invention: alkyl-naphthalene sulfonic acids and their water soluble salts, such as propyl, butyl, hexyl, benzylnaphthalene sulfonic acids and their water soluble alkali, ammonium or amine salts; sulfonates derived from long chain carbon compounds, including sulfonated petroleum oils; sulfonated terpenes; sulfonated resins and sulfonated rosin; sulfonated fatty substances, e. g., derived from vegetable or animal fats and oils, among which sulfonated castor oil, commonly called Turkey red oil, is a convenient, commercially available product particularly useful in the production of zinciferous agglomerates according to my invention, also sulfonated linseed oil, etc.; sulfonated esters or ethers of long chain alcohols such as for instance derivatives of acetyl-octyl alcohol, stero-glyceryl ether, etc.; sulfuric acid esters of long chain aliphatic alcohols (of at least 6 carbon atoms) such as the sulfuric acid esters of hexyl, octyl, decyl, lauryl, myristyl, mesityl, linoleyl alcohols, etc.; these last two groups are commonly referred to as "sulfation" products of long chain aliphatic alcohols; also other derivatives of long chain fatty alcohols and acids, provided the latter do not react with zinc oxide or other constituents of the materials to be agglomerated to form insoluble compounds.

In the practice of my invention I mix the zinciferous material with a small amount of water and the capillary-active agent. Enough water or aqueous solution of the agent is mixed with the comminuted zinciferous material to adequately wet the material for the contemplated agglomerating operation. Ordinarily the moisture content of the moistened mass may be from about 8 to 15% based on the dry weight of the zinciferous material. The amount of water necessary to render the mixture amenable to the subsequent agglomerating operation will depend upon various factors, including the nature of the agglomerating operation itself. It appears that in many instances when too much water is present part of it will be squeezed out during the kneading; or if not enough water is present, the kneading will result in a crumbly mass of the characteristics of a "short dough"; this improper condition can be corrected by further addition of water or solution of the agent, with continued kneading.

The mixing of the finely comminuted zinciferous material with the required amount of water and agent results usually in a mass resembling a moistened powder, or in the case of a coarser material it has the appearance of moistened sand.

The so moistened material is then kneaded, or mechanically worked to develop its plastic properties. This operation is carried out in any desired type of apparatus, preferably one which compresses and densifies the material, such as a chaser or pug mill, and may in some instances require one or more passages through a die under pressure. Kneading is continued until the mass has a dough-like consistency which distinguishes the so kneaded material from the mixture of the material before kneading or from a material which has been kneaded in the absence of the agent which I incorporate in the material to develop its plasticity.

During the kneading operation the solution of my agent tends to displace part or all of the film of gas surrounding the solid particles to be agglomerated and replace it by a film of solution. Any means such as moderate heat or vacuum that will aid in the displacement of the air or gas film will facilitate the development of plastic properties in the mass. It is desirable to have the films of solution between the particles as thin as possible; repeated compressions of the mass of particles will push them closer together, thus rendering the films of solution between the particles thin, and will tend to fill the interstices between the larger particles with finer particles and therefore increase the intimacy of contact and density of the mass. The application of moderate heat will decrease the viscosity of the film of solution between the particles and therefore increase the ease of sliding and gliding of the particles upon each other, or in other words increase the plasticity. This application of heat is particularly desirable if a binder is added which would normally increase the viscosity of the liquid phase, since the heat will tend to counteract this increase in viscosity. It will be understood that the mass should not be so intensely heated as to expel all the moisture therefrom.

The pasty, doughy mass obtained from the kneading operation is then ready for agglomeration. This is achieved in any desired manner, such as through briquetting presses or by extrusion through dies to form continuous ribbons, rods, pipes, etc. The material after extrusion is ordinarily of a consistency resembling unvulcanized rubber, and it is in some instances so tough that it cannot be separated into individual agglomerates by cutting with a wire, a method common in extruding clays. When this is the case, separate agglomerates may be cut off from the extruded mass by a circular or band saw or other appropriate cutting device.

When insufficient heat is generated in the kneading operation it may, in some cases, be desirable to apply heat during extrusion (for example, to the material just prior to its entrance to the die) in order to facilitate this operation.

It may also in certain cases be desirable to lubricate the surface of the die through which the kneaded mass is extruded by passing a direct electric current through the mass, with the polarity so chosen that the charge on the die is opposite to that carried by the solution of the agent employed in the mass, so that the solution tends to be drawn to the surface of the die and the film of solution thereby assists then in the extrusion. Sufficient current may be passed so that heat is generated in the mass being extruded by the electrical resistance of the mass to the flow of the current. Such heat may also facilitate the extrusion operation.

The agglomerates obtained in this manner have sufficient mechanical strength for all reasonable handling when wet and in most instances even after drying.

When cases arise where the dried agglomerates are to be submitted to great mechanical strains, such as when they are charged into high furnaces where the agglomerates have to carry a heavy load, it may become advisable to add a little binder to the masses to be agglomerated; such amounts, however, may be considerably less than those necessary in prior methods. I have, for instance, found that in cases where ordinarily up to 6% sulfite cellulose waste liquor as binder was required to produce a satisfactory dry agglomerate and where the replacement of this binder by about 5/100% Turkey red oil produced an entirely satisfactory wet agglomerate the addition of about 1% sulfite cellulose waste liquor to the Turkey red oil produced agglomerates, which when dry were superior in physical strength and other properties to agglomerates produced by prior methods with 6% binder.

The present invention is particularly adapted for the preparation of charges of zinciferous oxidic material and carbonaceous reducing material for smelting in furnaces of the vertical retort type. Among the advantages secured by this application of my invention are the following:

(1) The mixing and plasticizing operation requisite for preparing the charge for agglomeration is greatly facilitated, with resulting saving in power and increase in capacity of the mixing apparatus used to prepare the charge mix for agglomeration.

(2) In cases where the ore and carbonaceous fuel is of relatively small particle size and great specific surface no binder is required to form strong aggregates and in cases where the material contains large particles (for instance up to ¼ inch) considerably less binder is required than in the absence of the plasticizing agent, whereby a substantial economy is achieved.

(3) On account of the high degree of plasticity obtained by the invention, the agglomerates may readily be given such shape (for example tubular shape) that the effective thickness of the agglomerate is greatly reduced and the ratio of its surface to its volume is greatly increased so that the expulsion of zince vapor from the agglomerates is greatly facilitated, with consequent improved elimination of zinc from the charge.

The agglomerates produced in accordance with the present invention have relatively great strength when in green form (that is to say, before drying or coking), and when coked may be smelted in vertical retorts without substantial breaking down into fines.

As an illustration of the practice of the invention, I will describe the preparation of coked agglomerates for smelting in vertical retorts. The charge to be agglomerated may consist of about 58% roasted zinc blende, 28% bituminous coal and 14% anthracite coal. These materials may be mixed in a concrete mixer with the addition of about 15% water and about 0.083% Turkey red oil on the dry weight of materials. The mixture is then treated in a pug mill in which the material is forced through a shredder by augers into a de-airing or vacuum chamber. The material can then be worked into a plastic state by several passes through the die of an extruder. When the material has been rendered sufficiently plastic it can be extruded into tubes by means of an auger machine. Appropriate lengths may be cut from the extruded tube by means of a circular saw. The finished agglomerates have a tough consistency resembling unvulcanized rubber. It is desirable to so conduct the operation that the temperature of the material issuing from the final die is from 30 to 40° C. Heat may be supplied to the material to bring it to this temperature just before passing through the final die, if necessary. The moisture content of the material may be reduced by evaporation to from 7 to 10% during this treatment.

The green strength of the agglomerates when prepared from coarse material is preferably increased by adding to the mix about 1% of waste sulfite liquor binder. This addition may not be necessary if it is intended to coke the agglomerates immediately after extrusion without a substantial amount of handling. The agglomerates prepared in accordance with the present invention with a waste sulfite liquor binder content of 1% have a green strength approximately equal to that of agglomerates prepared in accordance with the heretofore customary practice with much more waste sulfite liquor binder. The agglomerates are coked in the customary manner.

Zinciferous materials difficult to agglomerate by prior art practices are readily agglomerated by practice of the present treatment. Thus, very finely divided flotation concentrates that have been roasted by the so-called flash-roasting process which are not easily wetted by water, can by the invention be readily agglomerated, without the use of unusually large amounts of binder or excessively prolonged mixing treatment, and the resulting agglomerates possess highly satisfactory mechanical properties, and when coked will not disintegrate to fines to any substantial extent during smelting in a vertical retort. Likewise, zinc oxide in the form of flue dust, refuse oxide or Waelz process oxide can be readily incorporated in such agglomerates.

This application contains subject matter described in my application Serial No. 22,491, filed May 20, 1935, for "Agglomerating comminuted materials". Said application claims broadly the process of agglomeration and the agglomerates also disclosed herein and claims 3 species of products to be agglomerated. The claims of the present application are limited to a fourth species, namely, zinciferous material.

I claim:

1. The improvement in the method of producing agglomerates containing comminuted zinciferous material which comprises moistening the materials to be agglomerated with water and a capillary-active agent containing the SO$_3$—X group in which X is hydrogen or a salt forming group said agent being incapable of acting as a binder, kneading the resulting moistened mass to plasticize the same the particles of said plasticized mass being held together by forces of capillary attraction, and forming agglomerates of the kneaded mass.

2. The improvement in the method of producing agglomerates containing a comminuted zinciferous material which comprises moistening the material to be agglomerated with water and a capillary-active agent selected from the group consisting of water soluble, sulfonated vegetable, animal and mineral oils, alkyl naphthalene sulfonates, sulfonated terpenes, sulfonated resins, sulfation products of higher aliphatic alcohols containing at least 6 carbon atoms and their water soluble salts said agent being incapable of acting as a binder, kneading the resulting moistened mass to plasticize the same the particles of said plasticized mass being held together by forces of capillary attraction, and forming agglomerates of the kneaded mass.

3. The improvement in the method of forming agglomerates containing a comminuted zinciferous material which comprises moistening the materials to be agglomerated with water and a small amount of Turkey red oil, kneading the resulting moistened mass to plasticize the same, and forming agglomerates of the kneaded mass.

4. The improvement in the method of producing agglomerates containing a comminuted zinciferous material which comprises moistening the materials to be agglomerated with water and a small amount of a sulfuric acid ester of an alcohol containing more than 6 carbon atoms, kneading the resulting moistened mass to plasticize it, and forming agglomerates of the kneaded mass.

5. The improvement in the method of producing agglomerates containing a comminuted zinciferous material which comprises moistening the materials to be agglomerated with water and a small amount of an alkyl naphthalene sulfonic acid, kneading the resulting moistened mass to plasticize it, and forming agglomerates of the kneaded mass.

6. The improvement in the method of producing agglomerates containing a comminuted zinciferous material which comprises moistening the materials to be agglomerated with water and an amount of Turkey red oil not in excess of 0.5% based on the dry weight of said materials, kneading the resulting moistened mass to plasticize it, and forming agglomerates of the kneaded mass.

7. The improvement in the method of producing agglomerates containing a comminuted zinciferous material which comprises moistening the materials to be agglomerated with water and a small amount of Turkey red oil, kneading the resulting moistened mass and extruding it through a die to plasticize it, and forming agglomerates of said kneaded and extruded mass.

8. The improvement in the method of producing agglomerates containing a comminuted zinciferous material which comprises moistening the materials to be agglomerated with water and a small amount of Turkey red oil, kneading and de-aerating the resulting moistened mass to plasticize it, and forming agglomerates of said moistened and de-aerated mass.

9. The improvement in the method of producing agglomerates containing a comminuted zinciferous material which comprises moistening the materials to be agglomerated with water and a small amount of Turkey red oil, kneading the resulting moistened mass, de-aerating it and extruding it through a die to plasticize it, and forming agglomerates of said kneaded, de-aerated and extruded mass.

10. The improvement in the method of producing agglomerates containing a comminuted zinciferous material which comprises moistening the materials to be agglomerated with water and a small amount of Turkey red oil, kneading and heating the resulting moistened mass to plasticize it and forming agglomerates of the kneaded mass.

11. The improvement in the method of producing agglomerates containing a comminuted zinciferous material which comprises moistening the materials to be agglomerated with water and a capillary-active agent selected from the group consisting of water soluble sulfonated vegetable, animal and mineral oils, alkyl naphthalene sulfonates, sulfonated terpenes, sulfonated resins, sulfation products of higher aliphatic alcohols containing at least 6 carbon atoms and their water soluble salts said agent being incapable of acting as a binder, kneading the resulting moistened mass and extruding it through a die to plasticize it, the particles of said plasticized mass being held together by forces of capillary attraction, and forming agglomerates of said kneaded and extruded mass.

12. The improvement in the method of producing agglomerates containing a zinciferous material and suitable for reducing operations which comprises mixing a carbonaceous fuel with a comminuted zinciferous material, moistening said mixture with water and a small amount of Turkey red oil, kneading the resulting moistened mass, de-aerating it and passing it through a die to develop its plasticity and forming agglomerates of said kneaded, de-aerated and extruded mass.

13. The improvement in the method of producing agglomerates of a mixture of comminuted zinciferous materials and comminuted carbonaceous reducing agents which comprises moistening said mixture with water and a capillary-active agent selected from the group of agents consisting of water soluble sulfonated vegetable, animal and mineral oils, alkyl naphthalene sulfonates, sulfonated terpenes, sulfonated resins, sulfation products of higher aliphatic alcohols containing at least 6 carbon atoms, and their water soluble salts said agent being incapable of acting as a binder, kneading the resulting moistened mass and extruding it through a die to plasticize it, the particles of said plasticized mass being held together by forces of capillary attraction, and forming agglomerates of said kneaded and extruded mass.

14. A formed agglomerate containing a zinciferous material in which an aqueous solution of Turkey red oil is present within the interstices between the particles of said material.

JOHN F. W. SCHULZE.